(12) United States Patent
Todeschini (10) Patent No.: US 10,594,391 B2
(45) Date of Patent: Mar. 17, 2020

(54) METHOD FOR SELECTING AN ANTENNA (71) Applicant: SAFRAN ELECTRONICS & DEFENSE, Boulogne Billancourt (FR)

(72) Inventor: Eric Todeschini, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/331,840

(22) PCT Filed: Sep. 26, 2017

(86) PCT No.: PCT/EP2017/074284
§ 371 (c)(1),
(2) Date: Mar. 8, 2019

(87) PCT Pub. No.: WO2018/055179
PCT Pub. Date: Mar. 29, 2018

(65) Prior Publication Data
US 2019/0342001 A1    Nov. 7, 2019

(30) Foreign Application Priority Data
Sep. 26, 2016   (FR) ..................................... 16 01402

(51) Int. Cl.
*H04B 7/26*         (2006.01)
*H04W 72/04*        (2009.01)
*H04W 72/08*        (2009.01)

(52) U.S. Cl.
CPC ........ *H04B 7/2656* (2013.01); *H04W 72/046* (2013.01); *H04W 72/048* (2013.01); *H04W 72/0446* (2013.01); *H04W 72/085* (2013.01)

(58) Field of Classification Search
CPC ........... H04W 56/001; H04W 36/0055; H04W 88/08; H04W 72/042; H04W 72/0446; H04B 7/0691; H04B 7/0626; H04B 7/0417; H04B 7/0619; H04B 7/061; H04B 7/0404; H04B 7/0802; H04B 7/082;
(Continued)

(56) References Cited

FOREIGN PATENT DOCUMENTS

| EP | 0 702 462 A1 | 3/1996 |
| FR | 2983015 A1 | 5/2013 |

OTHER PUBLICATIONS

Dec. 13, 2017 International Search Report issued in International Patent Application No. PCT/EP2017/074284.

*Primary Examiner* — Ricardo H Castaneyra
(74) *Attorney, Agent, or Firm* — Oliff PLC; R. Brian Drozd (57) ABSTRACT

An antenna is selected in a system including a first and at least one second device. The system forms a communication network of TDMA type where each communication occurs in frames. The first device includes plural antennas that each covers a predefined sector near the antennas. The frames are organised in a succession of groups of consecutive frames, each group being organised in a structure associating each frame with a pair formed by an antenna of the first device and of a second device, each possible pair being associated with a different frame in the group according to a position of the frame in the group. For each device including plural antennas: information is obtained representing communication quality between the device's antenna and the first or a second device's antenna, and the antenna is selected having the highest communication quality with an antenna of the first or a second device.

8 Claims, 4 Drawing Sheets

(58) Field of Classification Search
CPC .. H04B 7/0814; H04B 7/0808; H04B 7/0608; H04B 7/06; H04B 7/0602; H04B 7/04
See application file for complete search history.

METHOD FOR SELECTING AN ANTENNA

The invention relates to a method for selecting an antenna, and a system and devices implementing the method.

The preservation of human beings has become a major preoccupation in many fields. Thus, in many perilous missions, human beings are replaced by pilotless mobile devices. Mention can be made for example of certain observation missions over dangerous zones such as conflict zones, construction sites at a height, or nuclear sites, performed by pilotless airborne devices referred to as drones, those travelling on wheels, or floating or submersible devices.

Although some pilotless mobile devices are fully automatic, many of these devices are remotely controlled by one or more human beings from a control station. These pilotless mobile devices must generally transmit results of observations either to a person controlling them or to a person responsible for analysing data resulting from these observations. These data frequently comprise images and sometimes videos. It is then necessary to establish wireless communications between the pilotless mobile devices and the control station in order to provide remote control of said devices and transmission of the observation data. Such communications must be as reliable as possible firstly in order for a loss of control not to cause loss of the pilotless mobile device, which may have a very high cost, and secondly so that the observation data are as usable as possible.

In order to make the communications between the control station and a pilotless mobile device reliable, the control station and said mobile device may be equipped with a plurality of antennas. In order to increase the gain and range of these antennas, it is normal to use directional antennas each covering a predefined sector in the vicinity of the plurality of antennas. All the predefined sectors form a range zone around the plurality of antennas. When the pilotless mobile device is a drone, the range zone of a control station may for example take the form of a hemisphere around the plurality of antennas of the control station, while the range zone of the drone may take the form of a sphere around the plurality of antennas of the drone.

By definition, a pilotless mobile device moves around the control station. Consequently said mobile device passes successively from one predefined sector to another. Since each antenna in the plurality of antennas addresses a predefined sector, it is necessary to determine which antennas to use in order to establish the best possible communication between the control station and said mobile device. It is desirable to use a method for selecting an antenna that is sufficiently reactive for there to be no break in communication between the control station and the pilotless mobile device when passing from one predetermined sector to another.

It is moreover desirable to propose a method that is simple to implement at low cost.

According to a first aspect of the present invention, the present invention relates to a method for selecting an antenna in a system comprising a first device and at least one second mobile device, the system forming a communication network in which the first device communicates with each second device using a medium-access technique of the time division multiple access type in which each communication takes place in frames, each frame being divided into a plurality of timeslots comprising a first slot enabling the first device to transmit a first signal designating a second device and enabling each second device to synchronise timewise on a time reference of the first device, and a second slot enabling the second device designated by the first signal to transmit a second signal in response to the first signal in order to acknowledge its presence in the system, at least the first device comprising a plurality of antennas each covering a predefined sector in the vicinity of said plurality. The frames used in said system are organised in a succession of consecutive groups of frames, each group of frames being organised in a group structure associating each frame with a pair formed by an antenna of the first device and of a second device, each possible pair being associated with a different frame in the group of frames according to a position of said frame in said group, information representing the structure of the group being shared between the first and each second device. The method comprises, for each device in the system comprising a plurality of antennas: obtaining, from the first or second signal transmitted in each frame in a group of frames, information representing a quality of communication between an antenna of said device and an antenna of the first or second devices; and selecting, from all the information representing a quality of communication obtained, the antenna in its plurality of antennas offering the highest quality of communication with an antenna of the first or of a second device.

The first device and each said second device knows at all times which antenna to use in order to obtain the best communication performance. Moreover, the organisation of the frames in groups of frames and the sharing of the information representing the frame group structure between the various devices of the system makes it possible to avoid having to indicate, in the signals exchanged in the system, the antennas of the first device and the second devices to which a frame relates.

According to one embodiment, each antenna selected by a device is kept by said device for a predetermined number of frames following said selection, the selection being updated after said number of frames.

In this way, the reactivity of the updating of the antennas selected is controlled.

According to one embodiment, the first device obtains, for each antenna in its plurality of antennas, from the second signal transmitted in each frame in a group of frames, information representing a quality of communication between said antenna and an antenna of a second device to which said frame relates; and selects, for each second device, from each item of information representing a quality of communication between an antenna of the first device and an antenna of said second device, the antenna in its plurality of antennas offering the highest quality of communication between the first and said second device.

According to one embodiment, each second device comprising a plurality of antennas obtains, from the first signal transmitted in each frame in a group of frames, information representing a quality of communication between an antenna of the first device and an antenna of said second device; and selects, from each item of information representing a quality of communication between an antenna of the first device and an antenna of said second device, the antenna in its plurality of antennas offering the highest quality of communication between the first and said second device.

Thus each second device can use a first signal that does not designate it for selecting an antenna.

According to a second aspect of the invention, the invention relates to a system comprising a first device and at least one second device, each second device being mobile, the system forming a communication network in which the first device communicates with each second device using a medium-access technique of the time division multiple access type in which each communication takes place in frames, each frame being divided into a plurality of timeslots comprising a first slot enabling the first device to transmit a first signal designating a second device and enabling each second device to synchronise timewise on a time reference of the first device, and a second slot enabling the second device designated by the first signal to transmit a second signal in response to the first signal in order to acknowledge its presence in the system, at least the first device comprising a plurality of antennas each covering a predefined sector in the vicinity of said plurality. The frames used in said system are organised in a succession of groups of consecutive frames, each group of frames being organised in a group structure associating each frame with a pair formed by an antenna of the first device and of a second device, each possible pair being associated with a different frame in the group of frames according to a position of said frame in said group, information representing the structure of the group being shared between the first and each second device. Each device in the system comprising a plurality of antennas comprising: obtaining means for obtaining, from the first or second signal transmitted in each frame in a group of frames, information representing a quality of communication between an antenna of said device and an antenna of the first or of a second device; and selection means for selecting, from all the information representing a quality of communication obtained, the antenna in its plurality of antennas offering the highest quality of communication with an antenna of the first or of a second device.

According to a third aspect of the invention, the invention relates to a device of the control station type included in a system comprising at least one second mobile device, the system forming a communication network in which the control station communicates with each second device using a medium-access technique of the time division multiple access type in which each communication takes place in frames, each frame being divided into a plurality of timeslots comprising a first slot enabling the ground station to transmit a first signal designating a second device enabling each second device to synchronise timewise on a time reference of the first device, and a second slot enabling the second device designated in the first signal to transmit a second signal in response to the first signal, the control station comprising a plurality of antennas each covering a predefined sector in the vicinity of said plurality. The frames used in said system are organised in a succession of groups of consecutive frames, each group of frames being organised in a group structure associating each frame with a pair formed by an antenna of the first device and of a second device, each possible pair being associated with a different frame in the group of frames according to a position of said frame in said group, information representing the structure of the group being shared between the first and each second device. The ground station comprises obtaining means for obtaining, from the second signal transmitted in each frame in a group of frames, information representing a quality of communication between an antenna of the ground station and an antenna of a second device to which said frame relates; and selection means for selecting, for each second device, from each item of information representing a quality of communication between an antenna of the ground station and an antenna of said second device, the antenna in its plurality of antennas offering the highest quality of communication between the ground station and said second device.

According to a fourth aspect of the invention, the invention relates to a pilotless mobile device included in a system comprising a first device and at least one pilotless mobile device, the system forming a communication network in which the first device communicates with each pilotless mobile device using a medium-access technique of the time division multiple access type in which each communication takes place in frames, each frame being divided into a plurality of timeslots comprising a first slot enabling the first device to transmit a first signal designating a pilotless mobile device and enabling each pilotless mobile device to synchronise timewise on a time reference of the first device, and a second slot enabling the pilotless mobile device designated by the first signal to transmit a second signal in response to the first signal, the first device and each pilotless mobile device each comprising a plurality of antennas each covering a predefined sector in the vicinity of said plurality. The frames used in said system are organised in a succession of groups of consecutive frames, each group of frames being organised in a group structure associating each frame with a pair formed by an antenna of the first device and a pilotless mobile device, each possible pair being associated with a different frame in the group of frames according to the position of said frame in said group, information representing the group structure being shared between the first device and each pilotless mobile device. The pilotless mobile device comprises obtaining means for obtaining, from the first signal transmitted in each frame in a group of frames, information representing a quality of communication between an antenna of the first device and an antenna of said pilotless mobile device; and selection means for selecting, from each item of information representing a quality of communication between an antenna of the first device and an antenna of said pilotless mobile device, the antenna in its plurality of antennas offering the highest quality of communication between the first device and said pilotless mobile device.

According to a fifth aspect of the invention, the invention relates to a computer program characterised in that it comprises instructions for the implementation, by a device, of the method according to the first aspect when said program is executed by a processor of said device.

According to a sixth aspect of the invention, the invention relates to storage means characterised in that they store a computer program comprising instructions for the implementation, by a device, of the method according to the first aspect when said program is executed by a processor of said device.

The features of the invention mentioned above, as well as others, will emerge more clearly from a reading of the following description of an example embodiment, said description being given in relation to the accompanying drawings, among which.

The invention is described hereinafter in a context of a system comprising a control station and one to four drones. The control station and each drone have an antenna system comprising a plurality of antennas each addressing a predefined sector. The invention does however apply in other contexts, for example in a system comprising a control station comprising a plurality of antenna systems each having connected range zones, a drone being able to pass from one range zone to another. Moreover, the number of drones may be greater than four. In addition, the invention could just as well apply to other pilotless mobile devices such as those travelling on wheels, or floating or submersible devices.

Figure 1:
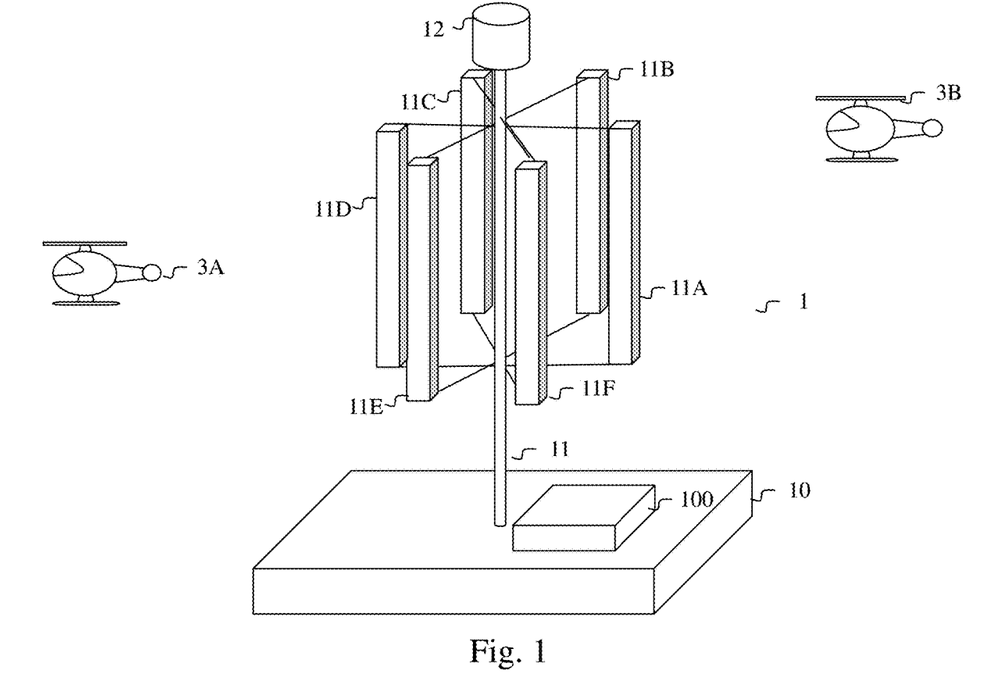
FIG. 1 illustrates schematically a system according to the invention.

FIG. 1 illustrates schematically an example of a system according to the invention.

In the example in FIG. 1, a system 1 comprises a control station 10 for simultaneously controlling drones 3A and 3B.

The control station 10 comprises an antenna system 11 comprising a plurality of antennas. The control station 10 comprises a processing module 100 able to implement the method according to the invention. The plurality of antennas comprises six sectoral antennas 11A, 11B, 11C, 11D, 11E and 11F and an omnidirectional antenna 12. Each sectoral antenna makes it possible to cover at −3 dB an azimuth of 60° and an elevation of +8°. The sectoral antennas each have a gain of +14 dBi. The omnidirectional antenna 12 makes it possible to cover at −3 dB an azimuth of 360° and from +8° to +90° in elevation with a gain ranging from +2.5 dBi to +6 dBi. The omnidirectional antenna 12 is used at short distances for passages of drones over the antenna system 11 of the control station 10. It should be noted that, apart from the improvement in terms of gain obtained by means of the combination of an omnidirectional antenna with sectoral antennas compared with a solution based solely on omnidirectional antennas, use of sectoral antennas makes it possible to be less sensitive to multipaths because of the directivity of the sectoral antennas.

Each drone (3A or 3B) comprises an antenna system (not shown) comprising two omnidirectional antennas (not shown), an omnidirectional antenna making it possible to cover at −3 dB an azimuth of 360° and from 0° to +90° in elevation, and an omnidirectional antenna making it possible to cover at −3 dB an azimuth of 360° and from 0° to −90° in elevation.

It should be noted that, in the example of the system 1 described in relation to FIG. 1, the control station 10 makes it possible to control from one to four drones simultaneously.

The system 1 described in relation to FIG. 1 forms a communication network in which the control station 10 communicates with the drones 3A and 3B. The control station 10 and the drones 3A and 3B exchange in particular control data in the direction from control station 10 to drone (3A or 3B) and observation data in the direction from drone (3A or 3B) to the control station 10. In the system 1, the control station 10 and the drones 3A and 3B use a medium-access technique of the time division multiple access (TDMA) type in which each data communication takes place in one or more frames. This medium-access technique requires time synchronisation at each node in the communication network (i.e. at the control station 10 and the drones 3A and 3B) in order to avoid any overlap in time. The communication network in FIG. 1 uses a centralised topology in which the control station 10 acts as a master node, that is to say the control station 10 sets the time for the whole of the network. The other nodes (i.e. the drones 3A and 3B) are slaves of the master node and set themselves timewise on a time reference given by the master node.

Figure 2:
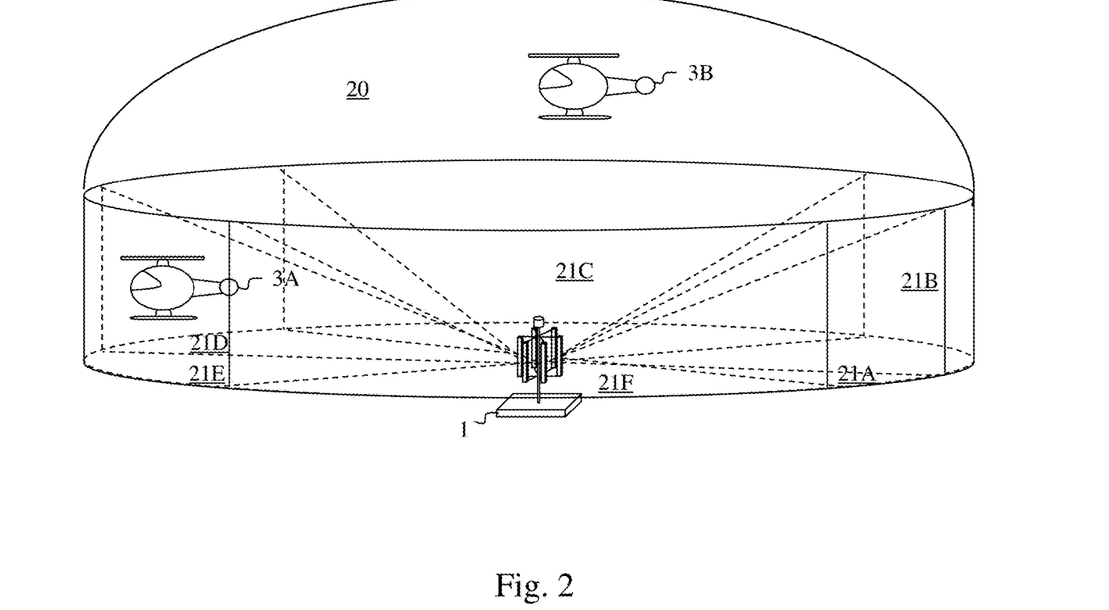
FIG. 2 illustrates schematically a range zone around the antenna system of a control station.

FIG. 2 illustrates schematically an example of a range zone around the antenna system 11 of the control station 10.

The range zone around the antenna system 11 can be seen schematically as a dome placed on a horizontal cylinder having the antenna system as its centre. This range zone comprises seven sectors. The six sectoral antennas 11A, 11B, 11C, 11D, 11E and 11F define respectively six sectors 21A, 21B, 21C, 21D, 21E and 21F. Each of the six sectors 21A, 21B, 21C, 21D, 21E and 21F has a semipyramidal shape of azimuth 60° and 8° of elevation. All the pyramidal shapes share the same vertex situated at the antenna system 11. The sectors 21A, 21B, 21C, 21D, 21E and 21F form a combined sector of 360° of azimuth and 8° of elevation fitting in the horizontal cylinder. The remaining part of the whole formed by the dome and the cylinder is the sector 20 covered by the omnidirectional antenna 12.

In the example in FIG. 2, the drone 3A is situated in the sector 21D covered by the antenna 11D, and the drone 3B is situated in the sector 20 covered by the antenna 12.

It should be noted that FIG. 2 shows a theoretical view of a division into sectors of a range zone and that in reality the range zone of an antenna is a transmission lobe having a non-zero intersection with transmission lobes of other antennas in the vicinity thereof.

Figure 3:
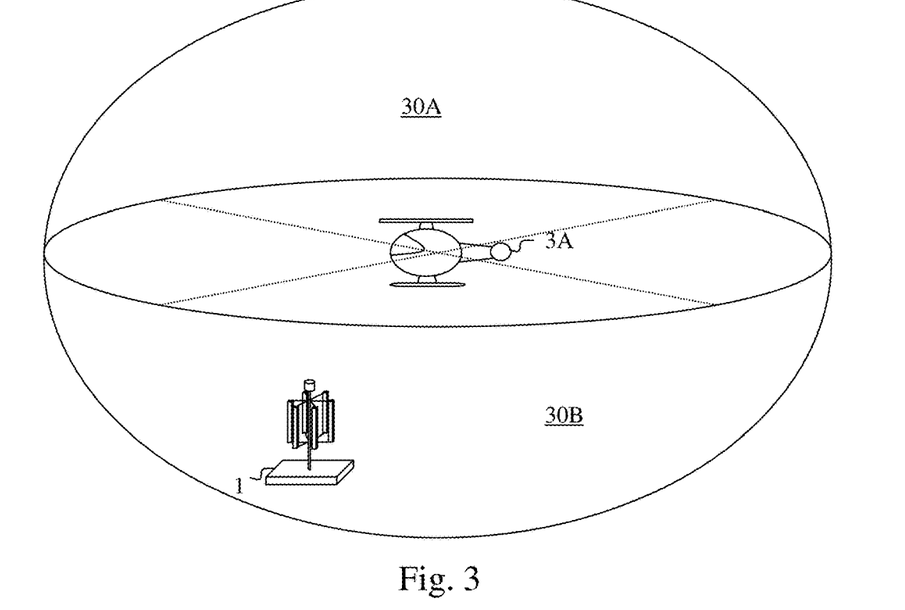
FIG. 3 illustrates schematically a range zone around an antenna system of a drone.

FIG. 3 illustrates schematically a range zone around an antenna system of a drone.

The range zone around the antenna system of a drone can be represented by a sphere. The omnidirectional antennas of the antenna system of each drone divide said sphere into two semihemispherical sectors (i.e. two hemispheres) 30A and 30B separated by a horizontal plane. In the example in FIG. 3, the antenna system 11 of the control station 10 is situated in the sector 30B.

Figure 4A:
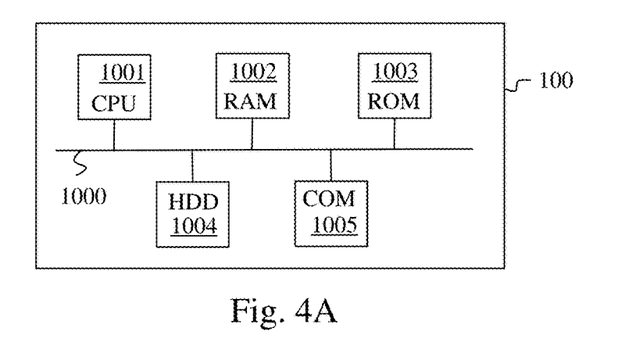
FIG. 4A illustrates schematically a processing module included in a control station.

FIG. 4A illustrates schematically an example of hardware architecture of the processing module 100 included in the control station 10.

According to the example of hardware architecture shown in FIG. 4A, the processing module 100 then comprises, connected by a communication bus 1000: a processor or CPU (central processing unit) 1001; a random access memory (RAM) 1002; a read only memory (ROM) 1003; a storage unit such as a hard disk or a storage medium reader, such as an SD (secure digital) card reader 1004; at least one communication interface 1005 enabling the processing module 100 to communicate with other modules or devices. For example, the communication interface 1005 enables the processing module 100 to communicate with other modules of the control station 10 such as an antenna-switching module for selecting an antenna to be used at a given instant or with other devices such as the drones 3A and 3B.

The processor 1001 is capable of executing instructions loaded in the RAM 1002 from the ROM 1003, from an external memory (not shown), from a storage medium (such as an SD card) or from a communication network. When the control module 10 is powered up, the processor 1001 is capable of reading instructions from the RAM 1002 and executing them. In one embodiment, these instructions form a computer program causing the complete or partial implementation by the processor 1001 of the method described below in relation to FIG. 6.

Figure 4B:
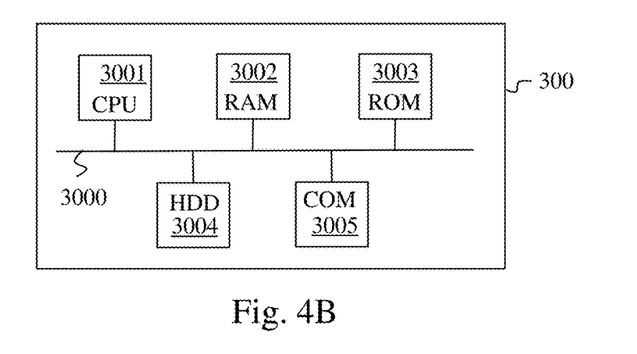
FIG. 4B illustrates schematically a processing module included in a drone.

FIG. 4B illustrates schematically an example of hardware architecture of a processing module 300 included in a drone such as the drone 3A or the drone 3B.

According to the example of hardware architecture shown in FIG. 4B, the processing module 300 then comprises, connected by a communication bus 3000: a processor or CPU (central processing unit) 3001; a random access memory (RAM) 3002; a read-only memory (ROM) 3003; a storage unit such as a hard disk or a storage medium reader such as an SD (secure digital) card reader 3004; at least one communication interface 3005 enabling the processing module 300 to communicate with other modules or devices. For example, the communication interface 3005 enables the processing module 300 to communicate with other modules such as an antenna-switching module for selecting an antenna to be used at a given instant or with the control station 10.

The processor 3001 is capable of executing instructions loaded in the RAM 3002 from the ROM 3003, from an external memory (not shown), from a storage medium (such as an SD card) or from a communication network. When a drone (3A or 3B) is powered up, the processor 3001 is capable of reading instructions from the RAM 3002 and executing them. In one embodiment, these instructions form a computer program causing the complete or partial implementation by the processor 3001 of the method described below in relation to FIG. 7.

Figure 6:
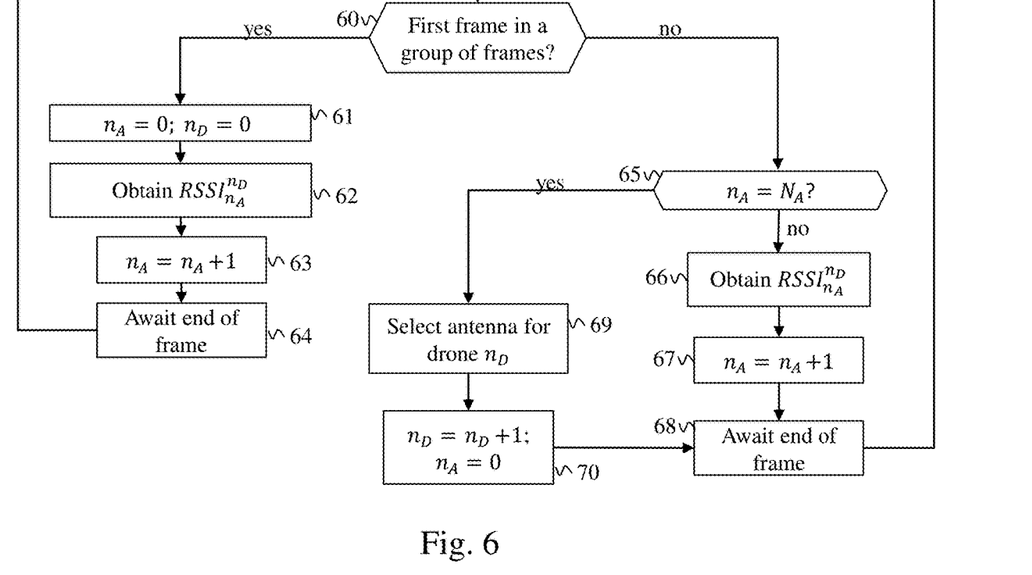
FIG. 6 illustrates schematically a method for selecting an antenna according to the invention implemented by a control station.
Figure 7:
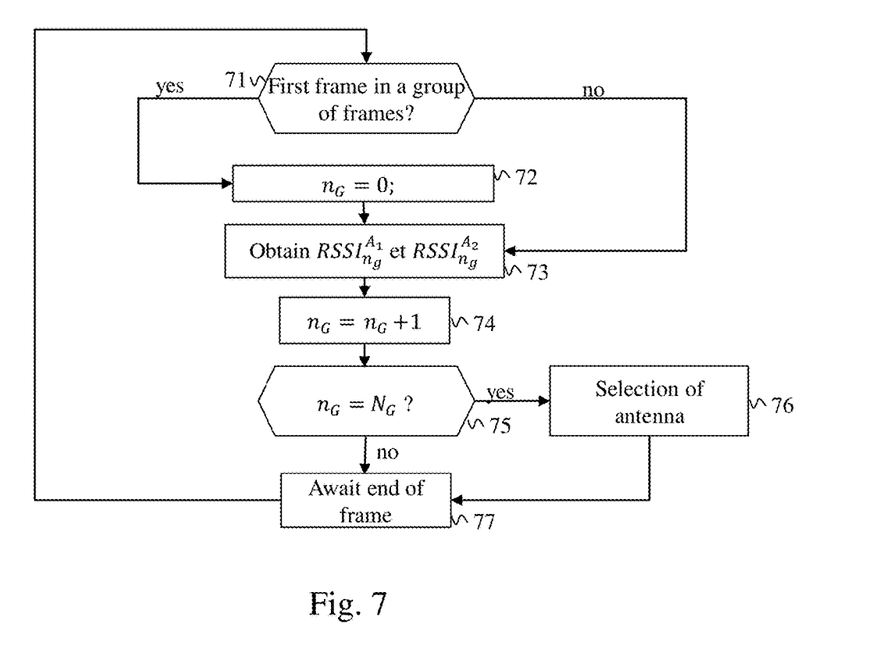
FIG. 7 illustrates schematically a method for selecting an antenna according to the invention implemented by a drone.

The methods described in relation to FIGS. 6 and 7 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 5:
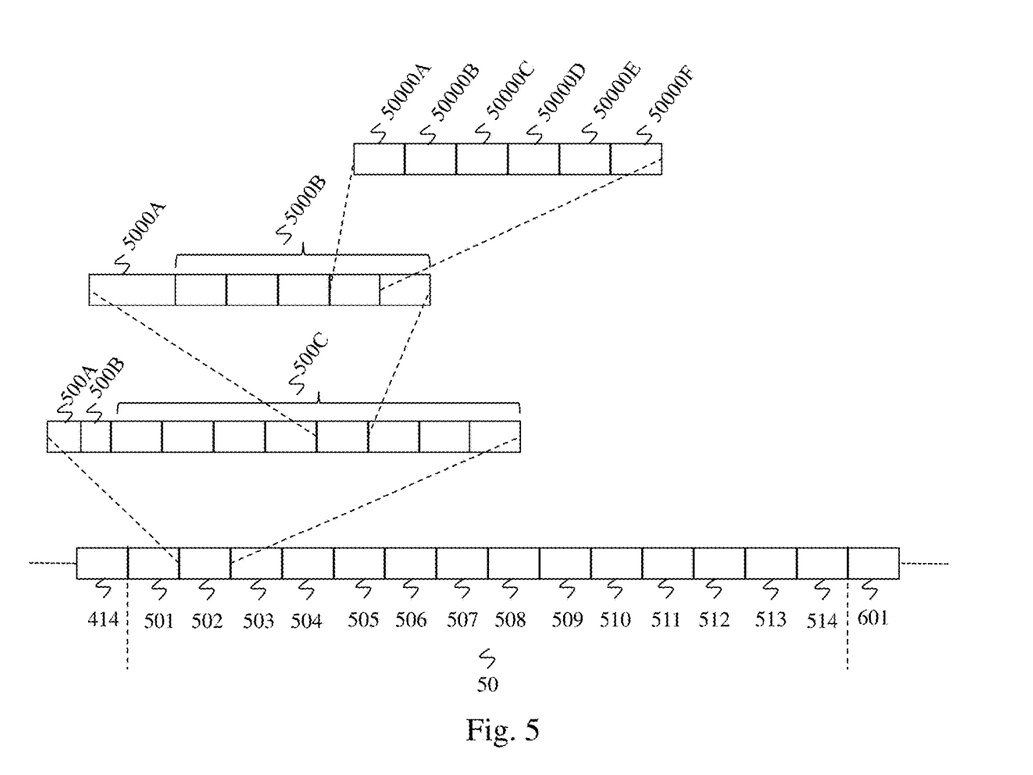
FIG. 5 illustrates schematically an organisation of frames according to the invention.

FIG. 5 illustrates schematically a frame organisation according to the invention.

The frames used in the system 1 are organised in a succession of groups of consecutive frames. A group of frames 50 is shown in FIG. 5. The group of frames 50 comprises a number of frames equal to the number of antennas of the antenna system 11 of the control station (i.e. seven) multiplied by the number of drones in activity in the system 1 (i.e. two). There are therefore as many frames in a group of frames as there are possible pairs formed by an antenna of the antenna system 11 and a drone. The group of frames 50 therefore comprises fourteen frames 501 to 514. A frame 414 belongs to a group of fourteen frames preceding the group of frames 50 and a frame 601 belongs to a group of fourteen frames following the group of frames 50.

FIG. 5 gives a detail of the frame 502 included in the group of frames 50, all the frames used in the system 1 having identical frame structures. The frame 502 is divided into a plurality of timeslots. The plurality of timeslots comprises a first slot 500A enabling the first device to transmit a first signal referred to as a beacon enabling each drone to synchronise itself on a time reference given by the control station 10. It is by means of this beacon that the drones in the system 1 can synchronise themselves. Moreover, the position of the frame in the group of frames indicates for which drone the beacon is intended. It is therefore considered that the first signal designates one drone among the drones in the system 10.

The plurality of timeslots also comprises a second slot 500B enabling the drone designated by the first signal to transmit a second signal enabling it thus to acknowledge its presence in the system 1.

The slots 500A and 500B are followed by a succession of slots 500C. Each of the slots in the succession of slots 500C enables a predetermined drone to transmit data to the control station 10 or to receive data coming from the control station 10. Each drone and the control station 10 share information describing an allocation of the slots in a frame. The information describing the allocation takes the form of an allocation table shared by all the nodes in the network. This allocation table may be fixed or be updated synchronously in all the nodes in the network in order for example to take into account stoppages of drones or arrivals of new drones in the system 1. Thus each drone knows in which slot of a frame it must transmit to the control station 10 and in which slot of a frame it can receive data coming from the control station 10. Likewise, the control station 10 knows in which slot of a frame it can transmit data to a given drone and in which slot of a frame it can receive data coming from a given drone. For example, in FIG. 5, the succession of slots 500C comprises a first slot used for communicating from the control station 10 to the drone 3A, a second slot used for communicating from the drone 3A to the control station 10, a third slot used for communicating from the control station 10 to the drone 3B and a fourth slot used for communicating from the drone 3B to the control station 10. The last four slots are left free, for example for two possible other drones.

FIG. 5 also gives a detail of a slot of the frame 502, each slot of a frame having an identical structure. A slot of a frame comprises a burst 5000A making it possible to take into account propagation times in the system 1, and a set of bursts 5000B.

FIG. 5 also gives a detail of a burst of a slot of a frame, each burst having an identical structure. Each burst comprises periods 50000A, 50000B and 50000F intended to take into account reaction times of electronic components of a drone 3A or 3B or of the control station 10. A period 50000C (referred to as a sequence preamble) is used for transmitting a sequence of symbols for effecting frequency, phase and timing synchronisations and reception signal equalisation. A period 50000D (referred to as selection mode) makes it possible to indicate a burst number in a frame in order to ensure time synchronisation of each of the drones on the control station. Moreover, this burst number enables each of the nodes to determine whether said burst relates to it for sending or receiving data. A period 50000E (referred to as a data block) make it possible to transmit useful data.

Each group of frames used in the system 1 is organised in accordance with a group structure associating each frame with a pair formed by an antenna of the control station 10 and a drone, each possible pair being associated with a different frame according to the position of said frame in the group. For example, in FIG. 5, frames 501 to 507 are associated with the drone 3A and the frames 508 to 514 are associated with the drone 3B. The frame 501 is associated with the antenna 11A, the frame 502 is associated with the antenna 11B, the frame 503 is associated with the antenna 11C, the frame 504 is associated with the antenna 11D, the frame 505 is associated with the antenna 11E, the frame 506 is associated with the antenna 11F and the frame 507 is associated with the antenna 12. The frame 508 is associated with the antenna 11A, the frame 509 is associated with the antenna 11B, the frame 510 is associated with the antenna 11C, the frame 511 is associated with the antenna 11D, the frame 512 is associated with the antenna 11E, the frame 513 is associated with the antenna 11F and the frame 514 is associated with the antenna 12. Thus, from the position of a frame in a group of frames, it is possible to determine which antenna of the control station is transmitting a beacon and for which drone said beacon is intended.

The group structure is known to all the nodes in the network and can for example form part of the information contained in the allocation table. This group structure may be fixed or may change in order to take into account stoppages of drones or arrivals of new drones.

FIG. 6 illustrates schematically a method for selecting an antenna according to the invention implemented by the control station 10.

The method described in relation to FIG. 6 is implemented by the processing module 100 of the control station for each group of frames. This method is a synchronous method since it follows the timing of the frames of the system 1 given by the control station 10. For a group of frames, referred to as the current group of frames, the method takes place as described below.

In a step 60, the processing module 100 determines what the position of the current frame is in the current group of frames.

When the current frame is the first frame in the current group of frames, the processing module 100 implements a step 61. During step 61, the processing module 100 initialises a variable $n_A$ for counting the number of antennas in the antenna system 11 that are examined and a variable $n_D$ for counting the number of drones in activity in the system 1 that are examined. Step 61 is for example implemented at the start of the first frame of the current group of frames. In FIG. 5, step 61 is typically implemented at the start of the frame 501.

In a step 62, the processing module 100 obtains information representing a quality of communication between an antenna in the antenna system 11 and an antenna of the drone to which said frame relates. To do this, the processing module 100 knows the frame group structure of the system 1. Moreover, the processing module 100 knows the position of the current frame in the current group of frames. Knowing the position of the current frame, it can deduce from this the pair formed by an antenna in the antenna system 11 and by a drone corresponding to the current frame. For example, when the current frame is the frame 501, the processing module can deduce that the pair corresponding to this frame is formed by the antenna 11A and the drone 3A. The information representing a quality of communication between the antenna 11A and an antenna of the drone 3A is an RSSI (received signal strength indication). This RSSI is measured on the second signal received from the drone 3A in the slot 500B of the frame 501, in response to the beacon (i.e. first signal) transmitted by the control station 10 using the antenna 11A in the slot 500A of the frame 501. In one embodiment, the RSSI value is provided by the communication interface 1005. A value of the RSSI measured is saved by the processing module 100 in a variable $RSSI_{n_A}^{n_D}$ for the pair corresponding to the current frame.

In a step 63, the processing module increments the variable $n_A$ by one unit.

In a step 64, the processing module 100 awaits the end of the current frame. When the current frame has ended, the processing module 100 returns to step 60.

When the current frame is not the first frame in a group of frames, step 60 is followed by a step 65. During step 65 the processing module 100 compares the variable $n_A$ with a number $N_A$ representing the number of antennas in the antenna system 11. If the variable $n_A$ is smaller than the number of antennas in the antenna system 11 $N_A$, step 65 is followed by a step 66.

During step 66, the processing module 100 obtains an RSSI value representing a quality of communication between an antenna of the antenna system 11 and an antenna of the drone to which said frame relates. An RSSI value is saved in a variable $RSSI_{n_A}^{n_D}$ by the processing module 100 for the pair formed by an antenna of the antenna system 11 and a drone corresponding to the current frame.

In a step 67, the processing module increments the variable $n_A$ by one unit.

In a step 68, the processing module 100 awaits the end of the current frame. When the current frame has ended, the processing module 100 returns to step 60.

When, during step 65, the variable $n_A$ is equal to the number of antennas in the antenna system 11 $N_A$, the processing module 100 implements a step 69.

During step 69, the processing module 100 selects, from all the information obtained representing a quality of communication, the antenna from its plurality of antennas offering the highest quality of communication with an antenna of the drone associated with the current value of the variable $n_D$. For example, in the case of FIG. 1, the drone 3A is associated with the value 0 of the variable $n_D$ (whatever the antenna of the drone used) and the drone 3B is associated with the value 1 of the variable $n_D$ (whatever the antenna of the drone used). The processing module 100 runs through the RSSI value saved in the variables $RSSI_{n_A}^{n_D}$ and selects the antenna corresponding to the maximum RSSI value observed for the drone associated with the current value of the variable $n_D$.

In a step 70, the processing module 100 increments the variable $n_D$ by one unit and reinitialises the variable $n_A$ to 0. Following step 70, the processing module again implements step 68 already explained.

In one embodiment, the antenna of the antenna system 11 selected during step 69 is kept by the control station 10 for a predetermined number of frames following said selection, the selection being updated again after said number of frames. In the example in FIG. 5, the antenna of the antenna system 11 to be used for communicating with the drone 3A is selected during the frame 507 and kept for the following seven frames (i.e. during frames 508 to 514) in the current group of frames. The antenna of the antenna system 11 to be used for communicating with the drone 3B is selected during the frame 514 and kept during the following seven frames (i.e. during frames 501 to 507) in the group of frames following the current group of frames.

In other embodiments, the selection can be updated again with a lower frequency, for example, in the context of FIG. 5, the antenna selected could be kept for 21 frames following the selection.

In one embodiment, the selection could be updated again with a frequency dependent on the number of drones active in the system 1.

In one embodiment, the processing module takes into account the fact that a sector covered by an antenna is a lobe overlapping with adjacent antenna lobes, in order to avoid frequent switchings from one antenna in the antenna system 11 to another. To do this, the processing module 100 applies a hysteresis algorithm. In this algorithm, a threshold for switching between two antennas is dependent on a hysteresis value predetermined according to characteristics of the antenna system.

The method described in relation to FIG. 6 is suited to the frame group structure described in relation to FIG. 5. The principles of this method remain the same for other frame group structures.

Moreover, the method described in relation to FIG. 6 is implemented by the processing module 100 of the control station 10. The processing module 300 of the drone (i.e. of the drone 3A or of the drone 3B) applies a similar method described in relation to FIG. 7 in accordance with the same principles as the method described in relation to FIG. 6.

FIG. 7 illustrates schematically a method for selecting an antenna according to the invention used by a drone (i.e. the drone 3A or the drone 3B) in the system 1.

The method described in relation to FIG. 7 is implemented by the processing module 300 of the drone for each group of frames. This method is a synchronous method since it follows the timing of the frames of the system 1 given by the control station 1. For a current group of frames, the method takes place as described below.

In a step 71, the processing module 300 determines what the position of the current frame is in the current group of frames.

When the current frame is the first frame in the current group of frames, the processing module 100 implements a step 72. During step 72, the processing module 300 initialises a variable $n_G$ for counting the number of frames examined in the current group of frames. Step 72 is for example implemented at the start of the first frame in the current group of frames. In FIG. 5, step 72 is typically implemented at the start of the frame 501.

In a step 73 the processing module 300 obtains, for each antenna of the antenna system of the drone, information representing a quality of communication between an antenna of the antenna system 11 and said antenna of the drone. To do this, the processing module 300 obtains, for each antenna of the antenna system of the drone, an RSSI value measured on the beacon (first signal) transmitted in the slot 500A of the current frame. This RSSI value is for example supplied by the communication interface 3005 of the processing module 300. In the example in FIG. 1, the antenna system of each drone comprises two antennas, a first antenna $A_1$ and a second antenna $A_2$. The RSSI value obtained for the antenna $A_1$ is saved in a variable $RSSI_{n_G}^{A_1}$ and the value of RSSI obtained for the antenna $A_2$ is saved in a variable $RSSI_{n_G}^{A_2}$.

In a step 74, the processing module 300 increments the variable $n_G$ by one unit.

In a step 75, the processing module 300 compares the value of the variable $n_G$ with a number $N_G$ representing the number of frames in a group of frames.

When the variable $n_G$ is lower than the number of frames in a group of frames $N_G$ the processing module 300 awaits the end of the current frame and returns to step 71.

When the variable $n_G$ is equal to the number of frames in a group of frames $N_G$, the processing module 300 implements a step 76. During step 76, the processing module 300 runs through the variables $RSSI_{n_G}^{A_1}$ and $RSSI_{n_G}^{A_2}$ saved and selects the antenna of the antenna system of the drone associated with the highest RSSI value. Step 76 is followed by step 77 already explained.

During step 71, when the current frame is not the first frame in a group of frames, the processing module 300 passes directly to step 73 without passing through step 72.

In one embodiment, the antenna of the drone system selected during step 76 is kept by the drone for a predetermined number of frames following said selection, the selection being updated again after said number of frames. In the example in FIG. 5, the antenna of the system of the drone 3A (or respectively 3B) to be used for communicating with the control station is selected during the frame 314 and kept during the following fourteen frames, i.e. the fourteen frames of the group of frames following the current group of frames. In other embodiments, the selection could be updated again with a lower frequency, for example, in the context of FIG. 5, the antenna selected could be kept for 28 frames following the selection.

In the same way as the processing module 100 takes into account the fact that the sectors covered by an antenna of the antenna system 11 is a lobe overlapping with lobes of adjacent antennas, in one embodiment the processing module 300 takes into account the fact that the sector covered by each antenna of the antenna system of the drone is an overlapping lobe in order to prevent frequent switchings from one antenna to another. In this embodiment, the processing module 300 also applies a hysteresis algorithm.

The invention claimed is:

1. A method for selecting an antenna in a system comprising a first device and at least one second mobile device, the system forming a communication network in which the first device communicates with each second device using a medium-access technique of a time division multiple access type in which each communication takes place in frames, each frame being divided into a plurality of timeslots comprising a first slot enabling the first device to transmit a first signal designating a second device and enabling each second device to synchronize timewise on a time reference of the first device, and a second slot enabling the second device designated by the first signal to transmit a second signal in response to the first signal in order to acknowledge its presence in the system, at least the first device comprising a plurality of antennas each covering a predefined sector in a vicinity of said plurality, wherein:

the frames used in said system are organized in a succession of groups of consecutive frames, each group of frames being organized in a group structure associating each frame with a pair formed by an antenna of the first device and of each second device, each possible pair being associated with a different frame in the group of frames according to a position of said frame in said group, information representing the structure of the group being shared between the first and each second device;

and wherein the method comprises, for each device in the system comprising a plurality of antennas:

obtaining, from the first and second signal transmitted in each frame in the group of frames, information representing a quality of communication between an antenna of said device and the antenna of the first or of at least one second device; and selecting, from all the information representing the quality of communication obtained, the antenna in its plurality of antennas offering a highest quality of communication with the antenna of the first or of at least one second device.

2. The method according to claim 1, wherein each antenna selected by each device is kept by said device for a predetermined number of frames following said selection, the selection being updated after said number of frames.

3. The method according to claim 1, wherein the first device:

obtains, for each antenna in its plurality of antennas, from the second signal transmitted in each frame in the group of frames, information representing the quality of communication between said antenna and the antenna of the second device to which said frame relates; and selects, for each second device, from each item of information representing the quality of communication between the antenna of the first device and the antenna of said second device, the antenna in its plurality of antennas offering the highest quality of communication between the first and said second device.

4. The method according to claim 1, wherein each second device comprising a plurality of antennas:

obtains, from the first signal transmitted in each frame in the group of frames, information representing the quality of communication between the antenna of the first device and the antenna of said second device; and selects, from each item of information representing the quality of communication between the antenna of the first device and the antenna of said second device, the antenna in its plurality of antennas offering the highest quality of communication between the first and said second device.

5. A non transitory information storage medium, storing a computer program comprising program code instructions which can be loaded in a programmable device to cause said programmable device to implement, the method according to claim 1 when said program code instructions are executed by a processor of said programmable device.

6. A system comprising a first device and at least one second device, each second device being mobile, the system forming a communication network in which the first device communicates with each second device using a medium-access technique of a time division multiple access type in which each communication takes place in frames, each frame being divided into a plurality of timeslots comprising a first slot enabling the first device to transmit a first signal designating a second device and enabling each second device to synchronize timewise on a time reference of the first device, and a second slot enabling the second device designated by the first signal to transmit a second signal in response to the first signal in order to acknowledge its presence in the system, at least the first device comprising a plurality of antennas each covering a predefined sector in a vicinity of said plurality, wherein:

the frames used in said system are organized in a succession of groups of consecutive frames, each group of frames being organized in a group structure associating each frame with a pair formed by an antenna of the first device and of each second device, each possible pair being associated with a different frame in the group of frames according to a position of said frame in said group, information representing the structure of the group being shared between the first and each second device;

and each device in the system comprising a plurality of antennas comprises:

obtaining means for obtaining, from the first or second signal transmitted in each frame in the group of frames, information representing a quality of communication between an antenna of said device and the antenna of the first or of at least one second device; and selection means for selecting, from all the information representing the quality of communication obtained, the antenna in its plurality of antennas offering a highest quality of communication with the antenna of the first or of at least one second device.

7. A ground control station included in a system comprising at least one second mobile device, the system forming a communication network in which the ground control station communicates with each second device using a medium-access technique of a time division multiple access type in which each communication takes place in frames, each frame being divided into a plurality of timeslots comprising a first slot enabling the ground control station to transmit a first signal designating a second device enabling each second device to synchronize timewise on a time reference of the ground control station, and a second slot enabling the second device designated in the first signal to transmit a second signal in response to the first signal, the ground control station comprising a plurality of antennas each covering a predefined sector in a vicinity of said plurality, wherein:

the frames used in said system are organized in a succession of groups of consecutive frames, each group of frames being organized in a group structure associating each frame with a pair formed by an antenna of the ground control station and of each second device, each possible pair being associated with a different frame in the group of frames according to a position of said frame in said group, information representing the structure of the group being shared between the ground control station and each second device;

and wherein the ground control station comprises:

obtaining means for obtaining, from the second signal transmitted in each frame in the group of frames, information representing a quality of communication between the antenna of the ground control station and the antenna of at least one second device to which said frame relates; and selection means for selecting, for each second device, from each item of information representing the quality of communication between the antenna of the ground control station and the antenna of said second device, the antenna in its plurality of antennas offering a highest quality of communication between the ground control station and said second device.

8. A pilotless mobile device included in a system comprising a first device and at least one pilotless mobile device, the system forming a communication network in which the first device communicates with each pilotless mobile device using a medium-access technique of a time division multiple access type in which each communication takes place in frames, each frame being divided into a plurality of timeslots comprising a first slot enabling the first device to transmit a first signal designating the pilotless mobile device and enabling each pilotless mobile device to synchronize timewise on a time reference of the first device, and a second slot enabling the pilotless mobile device designated by the first signal to transmit a second signal in response to the first signal, the first device and each pilotless mobile device each comprising a plurality of antennas each covering a predefined sector in a vicinity of said plurality, wherein:

the frames used in said system are organized in a succession of groups of consecutive frames, each group of frames being organized in a group structure associating each frame with a pair formed by an antenna of the first device and the pilotless mobile device, each possible pair being associated with a different frame in the group of frames according to a position of said frame in said group, information representing the group structure being shared between the first device and each pilotless mobile device;

and wherein the pilotless mobile device comprises:

obtaining means for obtaining, from the first signal transmitted in each frame in the group of frames, information representing a quality of communication between the antenna of the first device and the antenna of said pilotless mobile device; and selection means for selecting, from each item of information representing the quality of communication between the antenna of the first device and the antenna of said pilotless mobile device, the antenna in its plurality of antennas offering a highest quality of communication between the first device and said pilotless mobile device.

* * * * *